(12) United States Patent
Kruzeniski et al.

(10) Patent No.: US 8,825,699 B2
(45) Date of Patent: Sep. 2, 2014

(54) CONTEXTUAL SEARCH BY A MOBILE COMMUNICATIONS DEVICE

(75) Inventors: Michael J. Kruzeniski, Seattle, WA (US); Darren A. Apfel, Redmond, WA (US); Jonathan D. Friedman, Seattle, WA (US); Kathleen W. Holmes, Seattle, WA (US); David Henry Wykes, Seattle, WA (US)

(73) Assignee: ROVI Corporation, Santa Clara, CA (US)

( * ) Notice: Subject to any disclaimer, the term of this patent is extended or adjusted under 35 U.S.C. 154(b) by 0 days.

(21) Appl. No.: 12/433,605

(22) Filed: Apr. 30, 2009

(65) Prior Publication Data
US 2010/0105370 A1  Apr. 29, 2010

Related U.S. Application Data

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
*G06F 7/00* (2006.01)
*G06F 17/30* (2006.01)

(52) U.S. Cl.
USPC .......................................... 707/770; 707/805

(58) Field of Classification Search
USPC .................................................. 707/805, 770
See application file for complete search history.

(56) References Cited

U.S. PATENT DOCUMENTS

| | | | |
|---|---|---|---|
| 5,189,732 A | 2/1993 | Kondo | |
| 5,258,748 A | 11/1993 | Jones | |
| 5,463,725 A | 10/1995 | Henckel et al. | |
| 5,515,495 A | 5/1996 | Ikemoto | |
| 5,574,836 A | 11/1996 | Broemmelsiek | |
| 5,675,329 A | 10/1997 | Barker | |
| 5,860,073 A | 1/1999 | Ferrel et al. | |
| 5,905,492 A | 5/1999 | Straub et al. | |
| 5,914,720 A | 6/1999 | Maples et al. | |
| 5,963,204 A | 10/1999 | Ikeda et al. | |
| 6,008,816 A | 12/1999 | Eisler | |
| 6,184,879 B1 | 2/2001 | Minemura et al. | |
| 6,317,142 B1 | 11/2001 | Decoste et al. | |

(Continued)

FOREIGN PATENT DOCUMENTS

| CN | 1749936 | 3/2006 |
|---|---|---|
| CN | 1936797 | 3/2007 |

(Continued)

OTHER PUBLICATIONS

"International Search Report", Application No. PCT/US2010/028553, Application Filing Date: Mar. 24, 2010,(Nov. 9, 2010),9 pages.

(Continued)

*Primary Examiner* — Alexey Shmatov
(74) *Attorney, Agent, or Firm* — Ropes & Gray LLP

(57) ABSTRACT

Contextual search by a mobile communications device is described. In an implementation, a search query is a received and a context is detected of a user interface currently being displayed on a display device of a mobile communications device. One or more search results are displayed on a display device of a search performed in the detected context using the search query.

20 Claims, 10 Drawing Sheets

(56) References Cited

U.S. PATENT DOCUMENTS

| | | |
|---|---|---|
| 6,385,630 B1 | 5/2002 | Ejerhed |
| 6,396,963 B2 | 5/2002 | Shaffer |
| 6,424,338 B1 | 7/2002 | Andersone |
| 6,507,643 B1 | 1/2003 | Groner |
| 6,570,582 B1 | 5/2003 | Sciammarella et al. |
| 6,662,023 B1 | 12/2003 | Helle |
| 6,697,825 B1 | 2/2004 | Underwood et al. |
| 6,784,925 B1 | 8/2004 | Tomat |
| 6,865,297 B2 | 3/2005 | Loui |
| 6,876,312 B2 | 4/2005 | Yu |
| 6,904,597 B2 | 6/2005 | Jin |
| 6,961,731 B2 | 11/2005 | Holbrook |
| 6,983,310 B2 | 1/2006 | Rouse |
| 6,987,991 B2 | 1/2006 | Nelson |
| 7,007,238 B2 | 2/2006 | Glaser |
| 7,013,041 B2 | 3/2006 | Miyamoto |
| 7,058,955 B2 | 6/2006 | Porkka |
| 7,065,385 B2 | 6/2006 | Jarrad et al. |
| 7,065,386 B1 | 6/2006 | Smethers |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,158,123 B2 | 1/2007 | Myers |
| 7,178,111 B2 | 2/2007 | Glein et al. |
| 7,197,702 B2 | 3/2007 | Niyogi et al. |
| 7,213,079 B2 | 5/2007 | Narin |
| 7,216,588 B2 | 5/2007 | Suess |
| 7,249,326 B2 | 7/2007 | Stoakley et al. |
| 7,280,097 B2 | 10/2007 | Chen |
| 7,283,620 B2 | 10/2007 | Adamczyk |
| 7,289,806 B2 * | 10/2007 | Morris et al. ............... 455/432.3 |
| 7,296,184 B2 | 11/2007 | Derks et al. |
| 7,336,263 B2 | 2/2008 | Valikangas |
| 7,369,647 B2 | 5/2008 | Gao et al. |
| 7,388,578 B2 | 6/2008 | Tao |
| 7,403,191 B2 | 7/2008 | Sinclair |
| 7,447,520 B2 | 11/2008 | Scott |
| 7,461,151 B2 | 12/2008 | Colson et al. |
| 7,479,949 B2 | 1/2009 | Jobs |
| 7,480,870 B2 | 1/2009 | Anzures |
| 7,483,418 B2 | 1/2009 | Maurer |
| 7,496,830 B2 | 2/2009 | Rubin |
| 7,593,995 B1 | 9/2009 | He et al. |
| 7,606,714 B2 | 10/2009 | Williams et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,657,849 B2 | 2/2010 | Chaudhri et al. |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,782,332 B2 | 8/2010 | Nagata |
| 7,834,861 B2 | 11/2010 | Lee |
| 7,877,707 B2 | 1/2011 | Westerman et al. |
| 7,889,180 B2 | 2/2011 | Byun et al. |
| 7,983,718 B1 | 7/2011 | Roka |
| 8,006,276 B2 | 8/2011 | Nakagawa et al. |
| 8,074,174 B2 | 12/2011 | Suzuki et al. |
| 8,086,275 B2 | 12/2011 | Wykes et al. |
| 8,127,254 B2 | 2/2012 | Lindberg et al. |
| 8,131,808 B2 | 3/2012 | Aoki et al. |
| 8,150,924 B2 | 4/2012 | Buchheit et al. |
| 8,175,653 B2 | 5/2012 | Smuga |
| 8,238,526 B1 | 8/2012 | Seth et al. |
| 8,238,876 B2 | 8/2012 | Teng |
| 8,250,494 B2 | 8/2012 | Butcher |
| 8,255,473 B2 | 8/2012 | Eren et al. |
| 8,269,736 B2 | 9/2012 | Wilairat |
| 8,280,901 B2 * | 10/2012 | McDonald ................. 707/766 |
| 8,289,688 B2 | 10/2012 | Behar et al. |
| 8,294,715 B2 | 10/2012 | Patel et al. |
| 8,299,943 B2 | 10/2012 | Longe |
| 8,355,698 B2 | 1/2013 | Teng et al. |
| 8,385,952 B2 | 2/2013 | Friedman et al. |
| 8,411,046 B2 | 4/2013 | Kruzeniski et al. |
| 8,448,083 B1 * | 5/2013 | Migos et al. ................. 715/781 |
| 8,548,431 B2 | 10/2013 | Teng et al. |
| 8,634,876 B2 | 1/2014 | Friedman |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026349 A1 | 2/2002 | Reilly et al. |
| 2002/0035607 A1 | 3/2002 | Checkoway |
| 2002/0060701 A1 | 5/2002 | Naughton et al. |
| 2002/0070961 A1 | 6/2002 | Xu et al. |
| 2002/0091755 A1 | 7/2002 | Narin |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0154176 A1 | 10/2002 | Barksdale et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0040300 A1 | 2/2003 | Bodic |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 * | 7/2003 | Allen et al. ................. 709/217 |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0137884 A1 | 7/2004 | Engstrom et al. |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0250217 A1 | 12/2004 | Tojo et al. |
| 2005/0054384 A1 | 3/2005 | Pasquale et al. |
| 2005/0060647 A1 | 3/2005 | Doan et al. |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0114788 A1 | 5/2005 | Fabritius |
| 2005/0143138 A1 | 6/2005 | Lee et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0216300 A1 | 9/2005 | Appelman et al. |
| 2005/0223057 A1 | 10/2005 | Buchheit et al. |
| 2005/0232166 A1 | 10/2005 | Nierhaus |
| 2005/0250547 A1 | 11/2005 | Salman et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0059430 A1 | 3/2006 | Bells |
| 2006/0070005 A1 | 3/2006 | Gilbert et al. |
| 2006/0074771 A1 | 4/2006 | Kim |
| 2006/0103623 A1 | 5/2006 | Davis |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0172724 A1 | 8/2006 | Linkert et al. |
| 2006/0173911 A1 | 8/2006 | Levin et al. |
| 2006/0199598 A1 | 9/2006 | Lee et al. |
| 2006/0206590 A1 | 9/2006 | Wakasa et al. |
| 2006/0218234 A1 | 9/2006 | Deng et al. |
| 2006/0246955 A1 | 11/2006 | Nirhamo |

(56) References Cited

U.S. PATENT DOCUMENTS

| | | |
|---|---|---|
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0271520 A1* | 11/2006 | Ragan .................. 707/3 |
| 2006/0281448 A1 | 12/2006 | Plestid et al. |
| 2006/0293088 A1 | 12/2006 | Kokubo |
| 2006/0294396 A1 | 12/2006 | Witman |
| 2007/0005716 A1 | 1/2007 | LeVasseur et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0035513 A1 | 2/2007 | Sherrard et al. |
| 2007/0038567 A1 | 2/2007 | Allaire et al. |
| 2007/0054679 A1 | 3/2007 | Cho et al. |
| 2007/0061306 A1* | 3/2007 | Pell et al. .................. 707/3 |
| 2007/0061714 A1 | 3/2007 | Stuple et al. |
| 2007/0067272 A1* | 3/2007 | Flynt et al. .................. 707/3 |
| 2007/0073718 A1* | 3/2007 | Ramer et al. .................. 707/10 |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0106635 A1 | 5/2007 | Frieden et al. |
| 2007/0118801 A1 | 5/2007 | Harshbarger et al. |
| 2007/0127638 A1 | 6/2007 | Doulton |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0162850 A1 | 7/2007 | Adler et al. |
| 2007/0171192 A1 | 7/2007 | Seo et al. |
| 2007/0171238 A1 | 7/2007 | Ubillos et al. |
| 2007/0182595 A1 | 8/2007 | Ghasabian |
| 2007/0185847 A1 | 8/2007 | Budzik et al. |
| 2007/0192707 A1 | 8/2007 | Maeda et al. |
| 2007/0198420 A1 | 8/2007 | Goldstein |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0216651 A1 | 9/2007 | Patel |
| 2007/0225022 A1 | 9/2007 | Satake |
| 2007/0232342 A1 | 10/2007 | Larocca |
| 2007/0233654 A1 | 10/2007 | Karlson |
| 2007/0238488 A1 | 10/2007 | Scott |
| 2007/0247435 A1 | 10/2007 | Benko et al. |
| 2007/0250583 A1 | 10/2007 | Hardy |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0280457 A1 | 12/2007 | Aberethy |
| 2007/0281747 A1 | 12/2007 | Pletikosa |
| 2008/0005668 A1 | 1/2008 | Mavinkurve |
| 2008/0032681 A1 | 2/2008 | West |
| 2008/0036743 A1 | 2/2008 | Westerman |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0066010 A1 | 3/2008 | Brodersen et al. |
| 2008/0068447 A1 | 3/2008 | Mattila et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092057 A1 | 4/2008 | Monson et al. |
| 2008/0102863 A1 | 5/2008 | Hardy |
| 2008/0114535 A1 | 5/2008 | Nesbitt |
| 2008/0120571 A1 | 5/2008 | Chang et al. |
| 2008/0132252 A1 | 6/2008 | Altman et al. |
| 2008/0153551 A1 | 6/2008 | Baek et al. |
| 2008/0155425 A1 | 6/2008 | Murthy et al. |
| 2008/0155437 A1 | 6/2008 | Morris |
| 2008/0162651 A1 | 7/2008 | Madnani |
| 2008/0165132 A1 | 7/2008 | Weiss |
| 2008/0165136 A1 | 7/2008 | Christie et al. |
| 2008/0165163 A1 | 7/2008 | Bathiche |
| 2008/0167058 A1 | 7/2008 | Lee et al. |
| 2008/0168290 A1 | 7/2008 | Jobs et al. |
| 2008/0168403 A1* | 7/2008 | Westerman et al. .......... 715/863 |
| 2008/0172609 A1 | 7/2008 | Rytivaara |
| 2008/0180399 A1 | 7/2008 | Cheng |
| 2008/0182628 A1 | 7/2008 | Lee et al. |
| 2008/0189658 A1 | 8/2008 | Jeong et al. |
| 2008/0198141 A1* | 8/2008 | Lee et al. .................. 345/173 |
| 2008/0200142 A1 | 8/2008 | Adbel-Kader et al. |
| 2008/0208973 A1 | 8/2008 | Hayashi |
| 2008/0222560 A1 | 9/2008 | Harrison |
| 2008/0222569 A1 | 9/2008 | Champion |
| 2008/0242362 A1 | 10/2008 | Duarte |
| 2008/0259042 A1 | 10/2008 | Thorn |
| 2008/0261660 A1 | 10/2008 | Huh et al. |
| 2008/0263457 A1 | 10/2008 | Kim et al. |
| 2008/0270558 A1 | 10/2008 | Ma |
| 2008/0295017 A1 | 11/2008 | Tseng et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307364 A1 | 12/2008 | Chaudhri et al. |
| 2008/0309626 A1 | 12/2008 | Westerman et al. |
| 2008/0316177 A1 | 12/2008 | Tseng |
| 2008/0317240 A1 | 12/2008 | Chang et al. |
| 2009/0007017 A1 | 1/2009 | Anzures et al. |
| 2009/0012952 A1* | 1/2009 | Fredriksson .................. 707/5 |
| 2009/0029736 A1 | 1/2009 | Kim et al. |
| 2009/0037469 A1 | 2/2009 | Kirsch |
| 2009/0051671 A1 | 2/2009 | Konstas |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0077649 A1 | 3/2009 | Lockhart |
| 2009/0083656 A1 | 3/2009 | Dukhon |
| 2009/0083850 A1 | 3/2009 | Fadell et al. |
| 2009/0085851 A1 | 4/2009 | Lim |
| 2009/0085878 A1 | 4/2009 | Heubel |
| 2009/0089215 A1 | 4/2009 | Newton |
| 2009/0106694 A1 | 4/2009 | Kraft et al. |
| 2009/0109243 A1 | 4/2009 | Kraft |
| 2009/0111447 A1 | 4/2009 | Nurmi |
| 2009/0117942 A1 | 5/2009 | Boningue et al. |
| 2009/0119606 A1 | 5/2009 | Gilbert |
| 2009/0140061 A1 | 6/2009 | Schultz et al. |
| 2009/0140986 A1 | 6/2009 | Karkkainen et al. |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0170480 A1 | 7/2009 | Lee |
| 2009/0205041 A1 | 8/2009 | Michalske |
| 2009/0228825 A1* | 9/2009 | Van Os et al. .................. 715/780 |
| 2009/0265662 A1 | 10/2009 | Bamford |
| 2009/0284482 A1 | 11/2009 | Chin |
| 2009/0288032 A1 | 11/2009 | Chang et al. |
| 2009/0293014 A1 | 11/2009 | Meuninck et al. |
| 2009/0298547 A1 | 12/2009 | Kim et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315847 A1 | 12/2009 | Fujii |
| 2010/0008490 A1 | 1/2010 | Gharachorloo et al. |
| 2010/0075628 A1 | 3/2010 | Ye |
| 2010/0079413 A1 | 4/2010 | Kawashima et al. |
| 2010/0087169 A1 | 4/2010 | Lin |
| 2010/0087173 A1 | 4/2010 | Lin |
| 2010/0100839 A1* | 4/2010 | Tseng et al. .................. 715/780 |
| 2010/0103124 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |

(56) References Cited

U.S. PATENT DOCUMENTS

| | | |
|---|---|---|
| 2010/0105440 A1 | 4/2010 | Kruzeniski |
| 2010/0105441 A1 | 4/2010 | Voss |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0180233 A1 | 7/2010 | Kruzeniski |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1 | 4/2011 | Kim et al. |
| 2011/0231796 A1 | 9/2011 | Vigil |
| 2012/0028687 A1 | 2/2012 | Wykes |
| 2012/0050185 A1 | 3/2012 | Davydov et al. |
| 2012/0179992 A1 | 7/2012 | Smuga |
| 2012/0212495 A1 | 8/2012 | Butcher |
| 2012/0244841 A1 | 9/2012 | Teng et al. |
| 2013/0102366 A1 | 4/2013 | Teng |
| 2014/0068446 A1 | 3/2014 | Friedman |
| 2014/0094226 A1 | 4/2014 | Friedman |
| 2014/0109005 A1 | 4/2014 | Kruzeniski |

FOREIGN PATENT DOCUMENTS

| | | |
|---|---|---|
| CN | 101228570 | 7/2008 |
| CN | 101296457 | 10/2008 |
| CN | 101308440 | 11/2008 |
| CN | 101311891 | 11/2008 |
| CN | 102197702 | 9/2011 |
| EP | 0583060 | 2/1994 |
| EP | 1469375 | 10/2004 |
| EP | 1752868 | 2/2007 |
| JP | H03246614 | 11/1991 |
| JP | H06242886 | 9/1994 |
| JP | H0897887 | 4/1996 |
| JP | 2001125913 | 5/2001 |
| JP | 2002229906 | 8/2002 |
| JP | 2003076460 | 3/2003 |
| JP | 2004227393 | 8/2004 |
| JP | 2004357257 | 12/2004 |
| JP | 2005517240 | 6/2005 |
| JP | 2005242661 | 9/2005 |
| JP | 2005539432 | 12/2005 |
| JP | 2006139615 | 6/2006 |
| JP | 2006163647 | 6/2006 |
| JP | 2007141249 | 6/2007 |
| JP | 2007243275 | 9/2007 |
| JP | 2007527065 | 9/2007 |
| JP | 2007258893 | 10/2007 |
| JP | 2008148054 | 6/2008 |
| JP | 2008217808 | 9/2008 |
| JP | 2008536196 | 9/2008 |
| JP | 2008257442 | 10/2008 |
| JP | 2009015457 | 1/2009 |
| JP | 2009522666 | 6/2009 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 1020090041635 | 4/2009 |
| TW | 201023026 | 6/2010 |
| WO | WO-03062976 | 7/2003 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007121557 | 11/2007 |
| WO | WO-2007134623 | 11/2007 |
| WO | WO-2008030608 | 3/2008 |
| WO | WO-2008030976 | 3/2008 |
| WO | WO-2008031871 | 3/2008 |
| WO | WO-2008035831 | 3/2008 |
| WO | WO-2008104862 | 9/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |

OTHER PUBLICATIONS

"PCT Search Report and Written Opinion", Application No. PCT/US2010/034772, (Dec. 29, 2010), 12 pages.

"PCT Search Report and Written Opinion", PCT Application No. PCT/US2010/038730, (Jan. 19, 2011), 8 pages.

"PCT Search Report", U.S. Appl. No. PCT/US2009/061864, (May 14, 2010), 10 pages.

"PCT Search Report and Written Opinion", Application No. PCT/US2009/061382, (May 26, 2010), 10 pages.

"PCT Search Report and Written Opinion", Application No. PCT/US2009/061735, (Jun. 7, 2010), 11 pages.

"Kiosk Browser Chrome Customization Firefox 2.x", Retrieved from: <http://stlouis-shopper.com/cgi-bin/mozdev-wiki/,pl?ChromeCustomization> Making a new chrome for the kiosk browser, Kiosk Project Kiosk Browser Chrome Customization Firefox-2.x,(Aug. 16, 2007), 2 pages.

Harrison, Richard "Symbian OS C++ for Mobile Phones: vol. 3 ( Symbian Press): 3 (Paperback)", Retrieved from: <http://www.amazon.co.uk/Symbian-OS-Mobile-Phones-Press/dp/productdescription/0470066415>, (Jun. 16, 2003), 4 pages.

"How do you dial 1-800-FLOWERS", Retrieved from: <http://blogs.msdn.com/windowsmobile/archive/2007/02/06/how-do-you-dial-1-800-flowers.aspx>, (Feb. 6, 2007), 24 pages.

"Blackberry office tools: Qwerty Convert", Retrieved from: <http://blackberrysoftwarelist.net/blackberry/download-software/blackberry-office/qwerty_convert.aspx>, (Nov. 20, 2008), 1 page.

Gade, Lisa "Samsung Alias u740", Retrieved from: <http://www.mobiletechreview.com/phones/Samsung-U740.htm>, (Mar. 14, 2007), 6 pages.

"Dial a number", Retrieved from: <http://www.phonespell.org/ialhelp.html> on Nov. 20, 2008, 1 page.

"Apple IPhone—8GB AT&T", Retrieved from: <http://nytimes.com.com/smartphones/apple-iphone-8gb-at/4515-6452_7-32309245.html>, (Jun. 29, 2007), 11 pages.

"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/>, (May 13, 2008), 11 pages.

"Winterface Review", Retrieved from: <http://www.mytodayscreen.com/winterface-review/>, (Jul. 9, 2008), 42 pages.

Oliver, Sam "Potential iPhone Usability and Interface Improvements", Retrieved from: <http://www.appleinsider.com/articles/08/09/18/potential_iphone_usability_and_interface_improvements.html>, (Sep. 18, 2008), 4 pages.

"Google Android has Landed; T-Mobile, HTC Unveil G1", Retrieved from: <http://www.crn.com/retail/210603348> on Nov. 26, 2008., (Sep. 23, 2008), 5 Pages.

(56) References Cited

OTHER PUBLICATIONS

"Alltel Adds Dedicated Search Key to Phones", Retrieved from: <http://www.phonescoop.com/news/item.php?n=2159> on Nov. 26, 2008., (Apr. 12, 2007),2 Pages.

Oryl, Michael "Review: Asus P527 Smartphone for North America", Retrieved from: <http://www.mobileburn.com/review.jsp?Id=4257> on Dec. 17, 2008., (Mar. 5, 2008),1 Page.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.

Ha, Rick et al., "SIMKEYS: An Efficient Keypad Configuration for Mobile Communications", Retrieved from: <http://ieeexplore.ieee.org/stamp/stamp.jsp?arnumber=01362557.>, (Nov. 2004),7 Pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.

"Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.

"Keyboard (5)", Retrieved from: <http://landru.uwaterloo.ca/cgi-bin/man.cdi?section=5&topic=keyboard> on Dec. 11, 2008., (Aug. 11, 1997),8 Pages.

"Calc4M", Retrieved from: <http://www.hellebo.com/Calc4M.html>, (Sep. 10, 2008),4 Pages.

"MIDTB Tip Sheet: Book Courier", Retrieved from: <http://www.midtb.org/tipsbookcourier.htm> on Dec. 11, 2008., (Sep. 26, 2005),6 Pages.

"Freeware .mobi", Retrieved from: <http://www.palmfreeware.mobi/download-palette.html>, (Oct. 9, 2001),2 pages.

"Palette Extender 1.0.2", Retrieved from: <http://palette-extender.en.softonic.com/symbian>, (Jan. 21, 2003),2 pages.

Rice, Stephen V., et al., "A System for Searching Sound Palettes", Retrieved from: <http://www.comparisonics.com/FindSoundsPalettePaper.pdf>, (Feb. 28-29, 2008),6 pages.

"Multi-touch", Retrieved from <http://en.wikipedia.org/wiki/Multi-touch#Microsoft_Surface>, (Apr. 17, 2009),8 pages.

Wilson, Tracy V., "How the iPhone Works", Retrieved from: <http://electronics.howstuffworks.com/iphone2.htm>, (Jan. 2007),9 pages.

"DuoSense™ Multi-Touch Gestures", Retrieved from: <http://www.n-trig.com/Data/Uploads/Misc/DuoSenseMTG_final.pdf>, (Jul. 2008),4 pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004),13 Pages.

Nordgren, Peder "Development of a Touch Screen Interface for Scania Interactor", Retrieved from: <http://www.cs.umu.se/education/examina/Rapporter/PederNordgren.pdf>, (Apr. 10, 2007),67 Pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),pp. 1-2.

"Symbian Applications", Retrieved from: <http://symbianfullversion.blogspot.com/2008_12_01_archive.html> on May 5, 2009.,. (Jan. 2009),51 Pages.

Remond, Mickael "Mobile Marketing Magazine", Retrieved from: <http://www.mobilemarketingmagazine.co.uk/mobile_social_networking/> on May 5, 2009.. (Apr. 28, 2009),16 Pages.

"Womma", Retrieved from: <http://www.womma.org/blog/links/wom-trends/> on May 5, 2009., (2007),70 Pages.

Dolcourt, Jessica "Webware", Retrieved from: <http://news.cnet.com/webware/?categoryId=2010> on May 5, 2009., (Apr. 2009),13 Pages.

"HTC Shows HTC Snap with Snappy Email Feature", Retrieved from: <http://www.wirelessandmobilenews.com/smartphones/> on May 5, 2009>, (May 4, 2009),10 Pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008),3 pages.

"Live Photo Gallery—Getting Started—from Camera to Panorama", Retrieved from: <http://webdotwiz.spaces.live.com/blog/cns!2782760752B93233!1729.entry> on May 5, 2009., (Sep. 2008),7 Pages.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (2006),4 Pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),pp. 1-14.

"Mobile/UI/Designs/TouchScreen", Retrieved from: <https://wiki.mozilla.org/Mobile/UI/Designs/TouchScreen> on May 6, 2009., (Feb. 2009),15 Pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008),7 Pages.

"Touch Shell Free", Retrieved from: <http://www.pocketpcfreeware.mobi/download-touch-shell-free.html> on May 5, 2009., (Feb. 23, 2009),2 Pages.

"Parallax Scrolling", Retrieved from: <http://en.wikipedia.org/wiki/Parallax_scrolling> on May 5, 2009., (May 4, 2009),3 Pages.

Steinicke, Frank et al., "Multi-Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008),4 Pages.

Mann, Richard et al., "Spectrum Analysis of Motion Parallax in a 3D Cluttered Scene and Application to Egomotion", Retrieved from: <http://www.cs.uwaterloo.ca/~mannr/snow/josa-mann-langer.pdf.>, (Sep. 2005),15 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.

"PCT Search Report and Written Opinion", Application No. PCT/US2010/028699, (Oct. 4, 2010),10 pages.

"PCT Search Report and Written Opinion", Application No. PCT/US2010/028555, (Oct. 12, 2010),10 pages.

Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004),10 Pages.

Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008., (Apr. 2, 2008),1 page.

Singh, Kundan et al., "CINEMA: Columbia InterNet Extensible Multimedia Architecture", Retrieved from http://www1.cs.columbia.edu/~library/TR-repository/reorts/reports-2002/cucs-011-02.pdf, (Sep. 3, 2002),83 Pages.

Kcholi, Avi "Windows CE .net Interprocess Communication", Retrieved from http://msdn.microsoft.com/en-us/library/ms836784.aspx on Jul. 17, 2008., (Jan. 2004),15 Pages.

Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007),pp. 1-42.

"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., 8 pages.

Mao, Jeng "Comments of Verizon Wireless Messaging Services, LLC", Retrieved from: http://www.ntia.doc.gov/osmhome/warnings/comments/verizon.htm on May 6, 2009., 5 Pages.

"Oracle8i Concepts Release 8.1.5", Retrieved from: http://www.cs.umbc.edu/help/oracle8/server.815/a67781/c16queue.htm on May 6, 2009., 10 Pages.

(56) References Cited

OTHER PUBLICATIONS

"Oracle8i Application Developers Guide—Advanced Queuing", Retrieved from: http://www.cs.umbc.edu/help/oracle8/server.815/a68005/03_adq1i.htm on May 6, 2009., 29 Pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009,5 Pages.

"Final Office Action", U.S. Appl. No. 12/433,667, (Sep. 13, 2011),17 pages.

"Internet Explorer Window Restrictions", Retrieved from: http://technet.microsoft.com/en-us/library/cc759517(WS.10).aspx on Jun. 28, 2011, Microsoft TechNet,5 pages.

"Non-Final Office Action", U.S. Appl. No. 12/244,545, (Aug. 17, 2011),15 pages.

"Non-Final Office Action", U.S. Appl. No. 12/413,977, (Jul. 19, 2011),17 pages.

"Non-Final Office Action", U.S. Appl. No. 12/414,382, (Jul. 26, 2011),9 pages.

"Non-Final Office Action", U.S. Appl. No. 12/414,434, (Aug. 2, 2011),6 pages.

"Non-Final Office Action", U.S. Appl. No. 12/414,455, (Aug. 29, 2011),8 pages.

"Non-Final Office Action", U.S. Appl. No. 12/414,458, (Jul. 6, 2011),8 pages.

"Non-Final Office Action", U.S. Appl. No. 12/414,476, (Aug. 3, 2011),21 pages.

"Non-Final Office Action", U.S. Appl. No. 12/433,667, (Jun. 7, 2011),15 pages.

"Non-Final Office Action", U.S. Appl. No. 12/469,458, (Jul. 1, 2011),15 pages.

"Non-Final Office Action", U.S. Appl. No. 12/484,799, (Aug. 11, 2011),12 pages.

"Notice of Allowance", U.S. Appl. No. 12/414,458, (Aug. 10, 2011),6 pages.

"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008),3 pages.

Suror, "PocketShield-New Screenlock App for the HTC Diamond and Pro", Retrieved from: <http://wmpowerusercom/?tag=htc-touch-diamond> on Jun. 28, 2011 (Oct. 23, 2008),2 pages.

Terpstra, Brett "Beta Beat: Grape, a New Way to Manage Your Desktop Clutter", Retrieved from: Beta Beat: *Grape, a New Way to Manage Your Desktop Clutter* on Jun. 28, 2011, (Apr. 14, 2009),4 pages.

"Final Office Action", U.S. Appl. No. 12/244,545, (Dec. 7, 2011), 16 pages.

"Final Office Action", U.S. Appl. No. 12/413,977, (Nov. 17, 2011), 16 pages.

"Final Office Action", U.S. Appl. No. 12/414,476, (Dec. 1, 2011), 20 pages.

"Final Office Action", U.S. Appl. No. 12/469,458, (Nov. 17, 2011), 15 pages.

"Non-Final Office Action", U.S. Appl. No. 12/469,419, (Nov. 9, 2011), 15 pages.

"Non-Final Office Action", U.S. Appl. No. 12/469,480, (Sep. 22, 2011), 14 pages.

"Non-Final Office Action", U.S. Appl. No. 12/470,558, (Nov. 22, 2011), 9 pages.

"Non-Final Office Action", U.S. Appl. No. 12/484,845, (Dec. 7, 2011), 16 pages.

"Non-Final Office Action", U.S. Appl. No. 12/560,081, (Dec. 7, 2011), 16 pages.

"Notice of Allowance", U.S. Appl. No. 12/414,458, (Oct. 31, 2011), 2 pages.

"Notice of Allowance", U.S. Appl. No. 12/414,458, (Nov. 29, 2011), 2 pages.

La, Nick "Parallax Gallery", Available at <http://webdesignerwall.comtutorials/parallax-gallery/comment-page-1>,(Apr. 25, 2008), 16 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008), 16 pages.

"Advisory Action", U.S. Appl. No. 12/414,382, (Jan. 20, 2012),3 pages.

"Final Office Action", U.S. Appl. No. 12/414,382, (Dec. 23, 2011),7 pages.

"Final Office Action", U.S. Appl. No. 12/469,480, (Feb. 9, 2012),17 pages.

"Final Office Action", U.S. Appl. No. 12/560,081, (Mar. 14, 2012),16 pages.

"Non-Final Office Action", U.S. Appl. No. 12/414,434, (Jan. 17, 2012),7 pages.

"Non-Final Office Action", U.S. Appl. No. 12/433,667, (Feb. 3, 2012),16 pages.

"Notice of Allowance", U.S. Appl. No. 12/414,455, (Jan. 4, 2012),4 pages.

Beiber, Gerald et al., "Screen Coverage: A Pen-Interaction Problem for PDA's and Touch Screen Computers", In Proceedings of ICWMC 2007,(Mar. 2007),6 pages.

Wyatt, Paul "/Flash/the art of parallax scrolling", .net Magazine,(Aug. 1, 2007),pp. 74-76.

"Extended European Search Report", European Patent Application No. 09818253.8, (Apr. 10, 2012),7 pages.

"Final Office Action", U.S. Appl. No. 12/484,799, (Apr. 30, 2012),13 pages.

"Non-Final Office Action", U.S. Appl. No. 12/244,545, (Mar. 27, 2012),18 pages.

"Non-Final Office Action", U.S. Appl. No. 12/414,434, (May 31, 2012),7 pages.

"Non-Final Office Action", U.S. Appl. No. 12/469,419, (May 23, 2012),13 pages.

"Notice of Allowance", U.S. Appl. No. 12/414,382, (Apr. 4, 2012),4 pages.

"Notice of Allowance", U.S. Appl. No. 12/470,558, (Apr. 2, 2012),7 pages.

"Non-Final Office Action", U.S. Appl. No. 12/413,977, (Jul. 20, 2012), 18 pages.

"Non-Final Office Action", U.S. Appl. No. 12/480,969, (Aug. 7, 2012), 15 pages.

"Non-Final Office Action", U.S. Appl. No. 12/484,799, (Aug. 7, 2012), 13 pages.

"Notice of Allowance", U.S. Appl. No. 12/414,434, (Aug. 17, 2012), 4 pages.

"Notice of Allowance", U.S. Appl. No. 12/470,558, (Aug. 23, 2012), 2 pages.

"Notice of Allowance", U.S. Appl. No. 12/484,845, (Mar. 16, 2012), 5 pages.

"Final Office Action", U.S. Appl. No. 12/244,545, (Sep. 7, 2012), 23 pages.

"Final Office Action", U.S. Appl. No. 12/480,969, (Nov. 23, 2012), 18 pages.

"Non-Final Office Action", U.S. Appl. No. 12/414,476, (Nov. 9, 2012), 22 pages.

"Non-Final Office Action", U.S. Appl. No. 12/469,458, (Sep. 21, 2012), 14 pages.

"Non-Final Office Action", U.S. Appl. No. 12/469,480, (Oct. 17, 2012), 16 pages.

"Non-Final Office Action", U.S. Appl. No. 13/492,495, (Sep. 17, 2012), 8 pages.

"Notice of Allowance", U.S. Appl. No. 12/469,419, (Nov. 27, 2012),13 pages.

"Notice of Allowance", U.S. Appl. No. 12/484,799, (Oct. 22, 2012), 10 pages.

"Extended European Search Report", European Patent Application No. 09822736.6, (Dec. 18, 2012), 7 pages.

"Final Office Action", U.S. Appl. No. 12/433,667, (Jan. 7, 2013), 17 pages.

"Final Office Action", U.S. Appl. No. 12/469,458, (Feb. 1, 2013), 19 pages.

(56) References Cited

OTHER PUBLICATIONS

"Foreign Office Action", Chinese Application No. 200980142632.9, (Jan. 29, 2013), 11 pages.
"Foreign Office Action", Chinese Application No. 200980142661.5, (Jan. 21, 2013), 12 pages.
"Foreign Office Action", Chinese Application No. 201080015728.1, (Dec. 26, 2012), 9 pages.
"Foreign Office Action", Chinese Application No. 201080015788.3, (Dec. 24, 2012), 10 pages.
"Foreign Office Action", Chinese Application No. 201080023212.1, (Dec. 5, 2012), 10 pages.
"Non-Final Office Action", U.S. Appl. No. 13/492,495, (Dec. 19, 2012), 6 pages.
Crouch, Dennis "Smartphone Wars: Micron's Slide-to-Unlock Patent", (Jan. 30, 2013), 2 pages.
"Final Office Action", U.S. Appl. No. 12/414,476, (Apr. 8, 2013), 25 pages.
"Final Office Action", U.S. Appl. No. 12/469,480, (Apr. 10, 2013), 21 pages.
"Foreign Office Action", Chinese Application No. 200980142644.1, (Apr. 3, 2013), 10 pages.
"Foreign Office Action", Chinese Application No. 201080015728.1, (May 16, 2013), 10 pages.
"Foreign Office Action", Chinese Application No. 201080015788.3, (Jun. 5, 2013), 12 Pages.
"Foreign Office Action", Chinese Application No. 201080023212.1, (Jun. 5, 2013), 8 pages.
"Introducing Application Styling for Windows Forms", *Infragistics Software Manual*, Version 7.3.20072.1043, (Nov. 2007), 95 pages.
"Non-Final Office Action", U.S. Appl. No. 12/469,458, (May 3, 2013), 21 pages.
"Non-Final Office Action", U.S. Appl. No. 12/480,969, (Apr. 4, 2013), 22 pages.
"Notice of Allowance", U.S. Appl. No. 12/433,667, (Jun. 25, 2013),14 pages.
"Notice of Allowance", U.S. Appl. No. 13/492,495, (Apr. 26, 2013), 5 pages.
"Foreign Office Action", Chinese Application No. 200980142661.5, (Sep. 24, 2013), 8 Pages.
"Non-Final Office Action", U.S. Appl. No. 13/418,884, (Sep. 30, 2013), 7 pages.
"Foreign Office Action", Japanese Application No. 2011-530109, (Jul. 18, 2013), 4 Pages.
"Foreign Office Action", Chinese Application No. 201080015802.X, (Sep. 29, 2013), 11 Pages.
"Supplemental Notice of Allowance", U.S. Appl. No. 12/433,667, (Oct. 10, 2013), 2 pages.
"Final Office Action", U.S. Appl. No. 12/469,458, (Oct. 11, 2013), 24 pages.
"Foreign Office Action", Chinese Application No. 200980142632.9, (Jun. 14, 2013), 6 pages.
"Foreign Office Action", Japanese Application No. 2012-503523, (Apr. 22, 2013), 5 Pages.
"EP Search Report", European Application No. 10762112.0, (Aug. 2, 2013), 7 Pages.
"Final Office Action", U.S. Appl. No. 12/480,969, (Jul. 24, 2013),19 pages.
"Foreign Office Action", Chinese Application No. 200980142644.1, (Aug. 20, 2013), 9 Pages.
"Foreign Office Action", Japanese Application No. 2011-533353, (Jul. 5, 2013), 9 Pages.
"Foreign Office Action", Chilean Application No. 2379-2011, (Jul. 3, 2013), 8 pages.
"Foreign Office Action", Chinese Application No. 200980139831.4, (Jul. 1, 2013), 12 pages.
"Non-Final Office Action", U.S. Appl. No. 12/469,480, (Aug. 27, 2013), 22 pages.
"Supplemental Notice of Allowance", U.S. Appl. No. 12/433,667, (Aug. 1, 2013), 2 pages.
"Non-Final Office Action", U.S. Appl. No. 12/414,476, Oct. 25, 2013, 18 pages.
"Non-Final Office Action", U.S. Appl. No. 12/480,969, Oct. 29, 2013, 22 pages.
"Non-Final Office Action", U.S. Appl. No. 12/244,545, Dec. 19, 2013, 22 pages.
"Final Office Action", U.S. Appl. No. 12/469,480, Dec. 5, 2013, 24 pages.
"Foreign Office Action", MX Application No. Mx/a/2011/012279, Jul. 4, 2013, 3 Pages.
"Foreign Office Action", JP Application No. 2011-533353, Nov. 26, 2013, 4 pages.
"Foreign Office Action", JP Application No. 2012-503515, Nov. 18, 2013, 5 Pages.
"Foreign Office Action", JP Application No. 2012-503514, Aug. 7, 2013, 5 pages.
"Foreign Office Action", CN Application No. 201080015728.1, Oct. 29, 2013, 8 Pages.
"Final Office Action", U.S. Appl. No. 13/418,884, Dec. 30, 2013, 8 pages.
"Non-Final Office Action", U.S. Appl. No. 13/270,111, Oct. 21, 2013, 9 pages.
"Final Office Action", U.S. Appl. No. 12/480,969, Feb. 21, 2014, 21 pages.
"Foreign Office Action", JP Application No. 2011-533280, Nov. 26, 2013, 4 Pages.
"Foreign Notice of Allowance", JP Application No. 2012-503523, Oct. 24, 2013, 4 pages.
"Foreign Office Action", AU Application No. 2010234909, Mar. 17, 2014, 4 Pages.
"Foreign Office Action", CN Application No. 200980139831.4, Mar. 24, 2014, 9 Pages.
"Foreign Office Action", CN Application No. 200980142644.1, Mar. 5, 2014, 7 Pages.
"Foreign Office Action", JP Application No. 2012-511905, Jan. 28, 2014, 6 Pages.
"Foreign Office Action", RU Application No. 2011147058, Feb. 12, 2014, 6 Pages.
"Non-Final Office Action", U.S. Appl. No. 13/418,884, Mar. 10, 2014, 8 pages.
"Non-Final Office Action", U.S. Appl. No. 13/712,777, Mar. 20, 2014, 7 pages.
"Notice of Allowance", U.S. Appl. No. 13/270,111, Mar. 7, 2014, 6 pages.
"Final Office Action", U.S. Appl. No. 12/244,545, May 6, 2014, 24 pages.
"Final Office Action", U.S. Appl. No. 12/414,476, Apr. 24, 2014, 19 pages.
"Floating Layer", Retrieved from <http://web.archive.org/web/20011025040032/http://www.echoecho.com/toolfloatinglayer.htm> on Apr. 15, 2014, Oct. 25, 2001, 9 pages.
"Foreign Office Action", AU Application No. 2010260165, Mar. 25, 2014, 3 Pages.
"Foreign Office Action", AU Application No. 2010260165, May 1, 2014, 3 Pages.
"Foreign Office Action", CN Application No. 201080015802.X, May 19, 2014, 7 Pages.
"Foreign Office Action", JP Application No. 2011-530109, May 2, 2014, 4 Pages.
"Foreign Office Action", JP Application No. 2012-516218, Mar. 6, 2014, 6 Pages.
"Non-Final Office Action", U.S. Appl. No. 12/560,081, Apr. 30, 2014, 25 pages.

\* cited by examiner

CONTEXTUAL SEARCH BY A MOBILE COMMUNICATIONS DEVICE

RELATED APPLICATIONS

This application claims priority under 35 U.S.C. Section 119(e) to U.S. Provisional Patent Applications Nos. 61/107,945, 61/107,935, and 61/107,921, each of which was filed on Oct. 23, 2008, the entire disclosures of which are hereby incorporated by reference in their entirety.

BACKGROUND

Mobile communication devices (e.g., wireless phones) have become an integral part of everyday life. For example, a user traditionally used a mobile communications device to make telephone calls when the user was away from a fixed communications device, e.g., a house or office wired telephone. In some instances, the mobile communications device became the primary device via which the user communicated with other users as the user became accustomed to the convenience and functionality of the device.

Communication techniques that may be employed using a mobile communications device have also increased. For example, users were traditionally limited to telephone calls between mobile communications devices. Advances were then made to provide a variety of other communication techniques, e.g., text messaging and email. However, inclusion of these additional communication techniques on mobile communications devices having traditional form factors may cause these devices to become unwieldy and less suitable for mobile applications. For example, traditional input devices that were employed by these communication techniques may be less suitable when applied by traditional mobile communications devices.

SUMMARY

Contextual search by a mobile communications device is described. In an implementation, a search query is received and a context is detected of a user interface currently being displayed on a display device of a mobile communications device. One or more search results are displayed on a display device of a search performed in the detected context using the search query.

In an implementation, a mobile communications device includes a display device and one or more modules to cause display of one or more results on the display device of a search performed in a first context based on a search query. If a gesture is detected to switch from the first context to a second context, the modules are configured to cause display of one or more results of a search performed in the second context based on the search query.

In an implementation, a mobile communications device includes a display device and one or more modules to display search results on the display device of a first search performed in a first context based on a search query. If an input is received via a button of the mobile communications device that indicates that a scope of the first search is to be expanded, the modules are configured to perform a second search that includes a second context that was not part of the first search, the second search being performed without manual reentry of the search query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
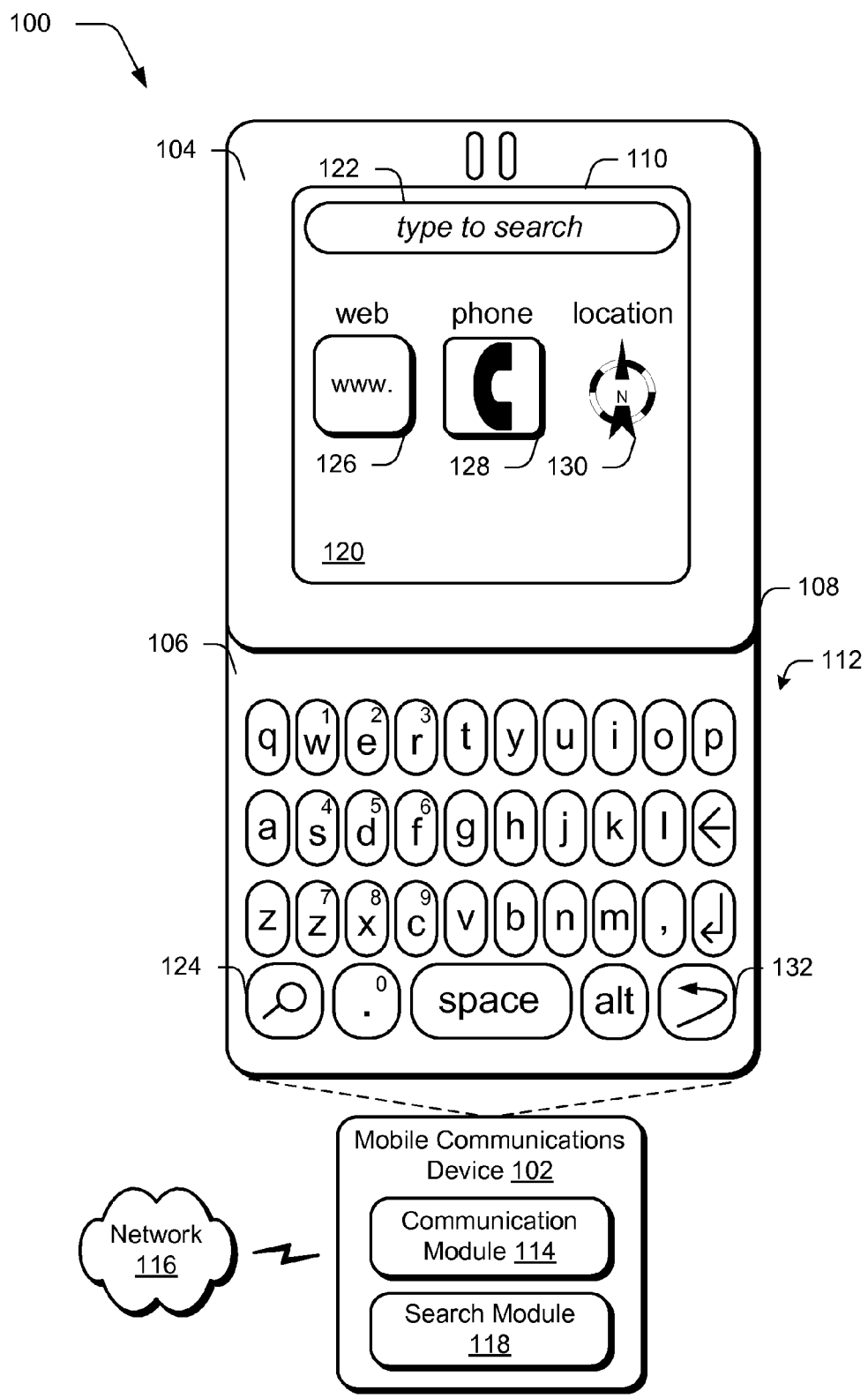
FIG. 1 is an illustration of an example implementation of a mobile communications device in accordance with one or more embodiments of devices, features, and systems for mobile communications.

Functionality is continually added to mobile communications devices (e.g., mobile phones), such as to consume music, store contacts, communicate via messages (e.g., SMS, MMS, email), consume streamed content (e.g., music and videos), and so on. Because of this, it is becoming progressively harder for users to find desired content stored on the mobile communications device. Additionally, because mobile communications devices are typically connected to a network, a user may desire content that is not stored locally on the mobile communications device but rather is accessible via the network.

Techniques are described to provide contextual search on a mobile communications device. These techniques may be implemented in a variety of ways to provide a variety of features. For example, a physical search button may be included with a keyboard of the mobile communications device to invoke a search. In this way, the search may be invoked throughout a user interface of the mobile communications device (e.g., by different applications through an API)

without consuming display area of the mobile communications device by display of a search input area when the search is not desired.

Contextual filtering of search results may also be performed based on context of a current output of a user interface by the mobile communications device. For example, a search may be performed for music when a music application is currently output in the user interface by the mobile communications device. Thus, in this example the music application provides the context to the search.

In an implementation, a context may be switched without reentering the search criteria, e.g., by performing a panning gesture, pressing a button of the mobile communications device, and so on. For example, a pan gesture may be detected via a display device to mimic switching from a phone context accessible via a particular column in a user interface to a web context accessible via an adjacent column in the user interface. Additionally, a search may be "scoped out" of a particular context, e.g., may increase a scope of the search from music, to an entirety of a mobile communications device, and even beyond the bounds of the mobile communications device to the Internet. Further discussion of contextual search may be found in relation to the following sections.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration in which the mobile communications device 102 is "closed" and a configuration illustrated in FIG. 1 in which the mobile communications device 102 is "open."

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of data, such as a caller identification (ID), information related to text messages as illustrated, email, multimedia messages, Internet browsing, game play, music, video and so on. In the illustrated implementation, the display device 110 is also configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the example shown in FIG. 1, the first and second housings 104, 106 of the mobile communications device 102 are approximately squared. For example, a plane defined by an outer surface of the display device 114 may be parallel to a plane of the first housing 104 that approximates a square, which may be the same as or different from the plane defined by the display device 110. In other words, the width and height of the plane taken from the first housing 104 that is parallel to the other surface of the display device 110 is approximately one-to-one. Likewise, the second housing 106 may be considered square along a plane that is parallel to and/or is the same as an outer surface of the keyboard 112 disposed within the second housing 106.

The mobile communications device 102 may assume a "closed configuration" such that the first housing 104 covers the second housing 106 by sliding the housing together using the slide 108. Consequently, the keyboard 112 disposed on the second housing 106 may be covered and made not available to for interaction by a user of the mobile communications device 102. In an implementation, telephonic functionality is still available when the mobile communications device 102 is in the closed configuration, e.g., to receive a telephone call.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 (i.e., the physical keys) is exposed such that the exposed keys are available for use to provide inputs. The open configuration results in an extended form factor of the mobile communications device 102 as contrasted with the form factor of the mobile communications device 102 in the closed configuration. In an implementation, the planes of the first and second housings 104, 106 that are used to define the extended form factor are parallel to each other, although other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

In the mobile communications device 102 of FIG. 1, a portion of the keys of the keyboard 112 are illustrated as sharing multiple functions. For example, a numeric keypad may be provided within physical keys of the QWERTY layout as illustrated by the physical keys "w", "e", "r", "s", "d", "f", "z", "x", "c", and "." as sharing numbers "1", "2", "3", "4", "5", "6", "7", "8", "9", and "0", respectively. The numbers may be accessed by pressing the "ALT" key of the keypad 112. A variety of other examples are also contemplated, an example of which may be found in relation to the following figure.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. A user, for instance, may form a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The mobile communications device 102 is also illustrated as including a search module 118. The search module 118 is representative of functionality of the mobile communication device 102 to perform a search and generate a user interface 120. The user interface 120 is illustrated as including a search query input area 122 that is configured to receive a search query.

There are a variety of different ways of initiating a search. For example, an input may be received from the keyboard 112 which causes output of the user interface 120 and input of corresponding letters as a search query in the search query input area 122. In another example, a dedicated physical search button 124 of the keyboard 112 may be pressed to cause output of the user interface 120. A variety of other examples are also contemplated, such as by selecting a representation in a menu displayed on the display device 110 or upon receipt of an input in the search query input area 122 from the keyboard 122 (e.g., when a user starts typing without selecting a specific portion of the user interface 120.

Depending on where the search was initiated, the search module 118 may configure the user interface 120 in a variety of ways. As illustrated in FIG. 1, for instance, the user interface 120 may be output without being scoped to a particular context. In this example, the user interface 120 includes a plurality of portions that are selectable to specify a particular context, illustrated instances include representations of the web 126, a phone 128, and location 130. In another example, the user interface 120 may be scoped to a particular context automatically and without user intervention based on a current context of an output by the mobile communications device 102, further discussion of which may be found in relation to FIG. 7.

In an implementation, if a user starts typing on the keyboard 112 without selecting a context, the phone 128 context is selected by default. This may be represented by an animation that gives an appearance of zooming-in to the phone 128 context icon displayed in the user interface 120.

In another implementation, a user may manually select a context. For example, a user may manually select the representation of the web 126 to cause a web search to be performed. In response to the selection (e.g., by pressing the display device 110 using touchscreen functionality), an animation may be output to animate into that context. As the user enters the search query using the keyboard 112 or other input device, the search module 118 performs the search in the selected context. In an implementation, auto-complete functionality may be used to increase efficiency in entering the search query. A user may also switch contexts (e.g., by panning) used to perform the search after the search query is entered, further discussion of which may be found in relation to the following figure.

Figure 2:
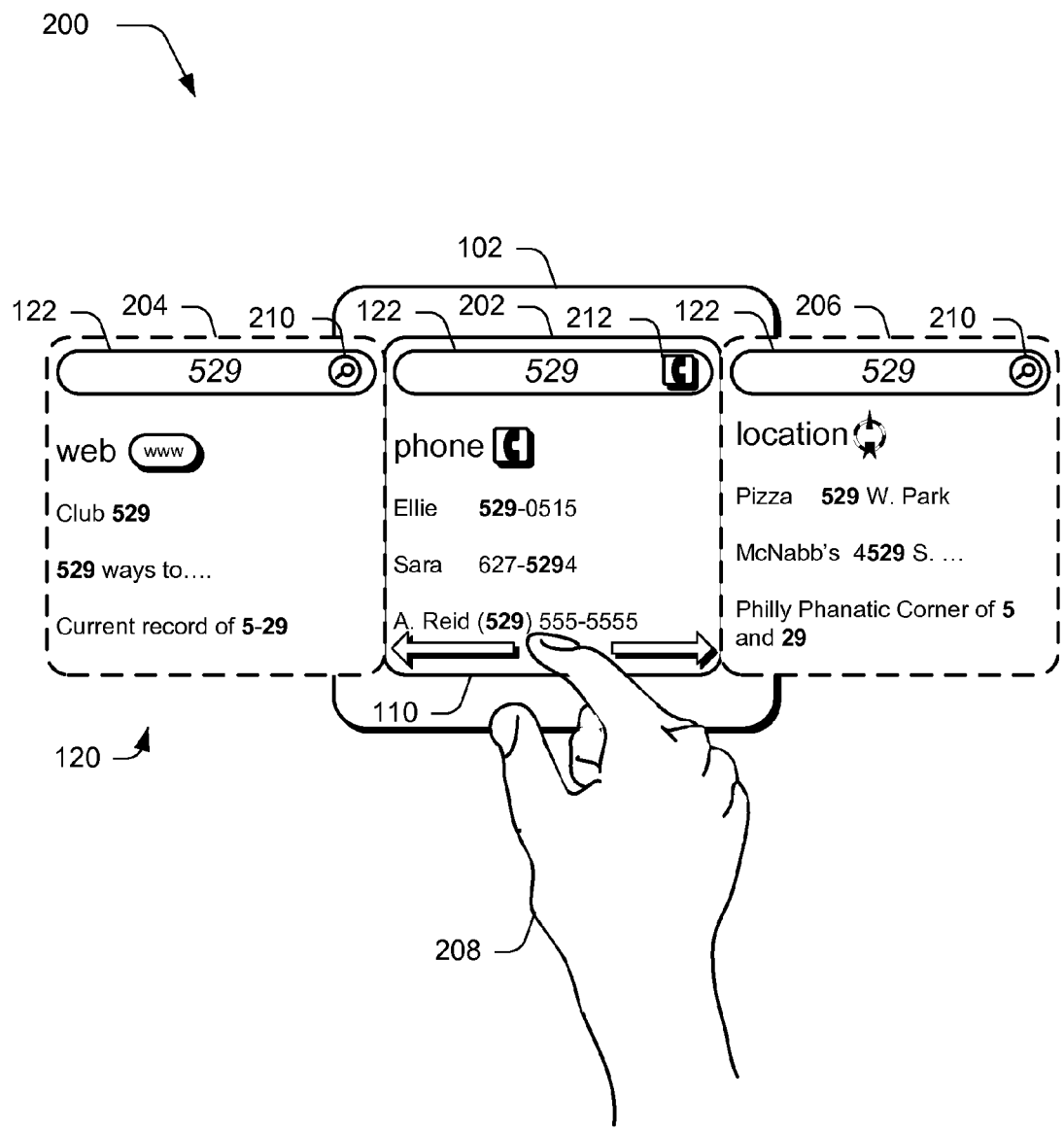
FIG. 2 illustrates an example implementation in which a gesture is utilized to switch a context used to perform a search by the mobile communications device of FIG. 1.

FIG. 2 illustrates an example implementation in which a gesture is utilized to switch contexts used to perform a search by the mobile communications device 102 of FIG. 1. The mobile communications device 102 is illustrated as outputting the user interface 120 on the display device 110. The user interface 120 has three contexts in the illustrated example arranged in columns. A phone context 202 is illustrated as currently being output on the display device 110. A web context 204 and a location context 206 are illustrated as not currently output on the display device 110 (and accordingly are illustrated in phantom) and are arranged in columns to the left and right of the phone context 202, respectively, to indicate "where" the contexts are located in respect to the phone context 202.

The phone context 202 includes the search query input portion 122 having a search query "529." Search results that include telephone number from contacts stored in the mobile communication device 102 are displayed in a column of the phone context 202 below the search query input portion 122. In an implementation, the search results are selectable to initiate a communication (e.g., telephone call) using the contact information. Further, additional content may be searched from the phone 128 context such as applications, data, and so on.

In an implementation, the user may change the context in a variety of ways. For example, a user may navigate between the columns of the user interface 120 using one or more physical buttons of the keyboard 112 of FIG. 1. In another example illustrated in FIG. 2, a gesture may be performed to pan between the columns. For example, a finger of a user's hand 208 may be placed on the display device 110 to "drag" the user interface 120 in the desired direction to switch from the phone context 202 to the web context 204 or the location context 206. In an implementation, the search query is automatically reused to perform a search in the respective context. In this way, a user may perform the search in different contexts without manually reentering the search query in the search query input portion 122. A variety of other examples (e.g., gestures) are also contemplated to switch contexts.

As illustrated in FIG. 2, the search query input area 122 includes a search button 210 that is selectable to initiate a search when in the web 204 and location 210 contexts, but not the phone 202 context. When in the phone 202 context, a dial button 212 is included in the search query input area 122 that is selectable to initiate a telephone call using numbers and/or letters input in the search query input area 122.

The telephone number may be displayed in the search query input area 122 according to the following logic. If the query starts with a number or a plus sign the dial button 212 is displayed. The telephone number may then disappear when the user enters a small-cap letter that does not correspond to a number. For example, when the user enters a "q" the user interface may display contacts that include a "q." The telephone number may also disappear when the user has entered more than the maximum number of digits for a locale before initiating dialing.

In an implementation, if the user has entered a capitalized letter the letter is translated to a number according to the 12-key digit-letter telephone keypad layout unless it violates one or more of the conditions above. The conditions may be validated each time there is a change in the query string such the telephone number field may appear/disappear as the query changes. The telephone number may be automatically formatted to include a plus sign, dashes and parentheses as appropriate by the communication module 114.

If the context was automatically selected for the user (e.g., by manually selecting the phone 128 context of FIG. 1), deleting each of the inputs in the search query input area 122 may cause the user interface 120 to "zoom out" of the selected context. Additionally, pressing the back button 132 may cause text entered into the search query input area 122 to be erased upon exit of the default context back to a main search screen as illustrated in FIG. 1. In another example, the back button 132 may cause the search to "scope out," further discussion of which may be found in relation to FIG. 9. In an implementation, an input is retained upon exit of a search application (e.g., search module 118) such that the input remains upon re-initiation of the search application until a new input is provided.

Figure 3:
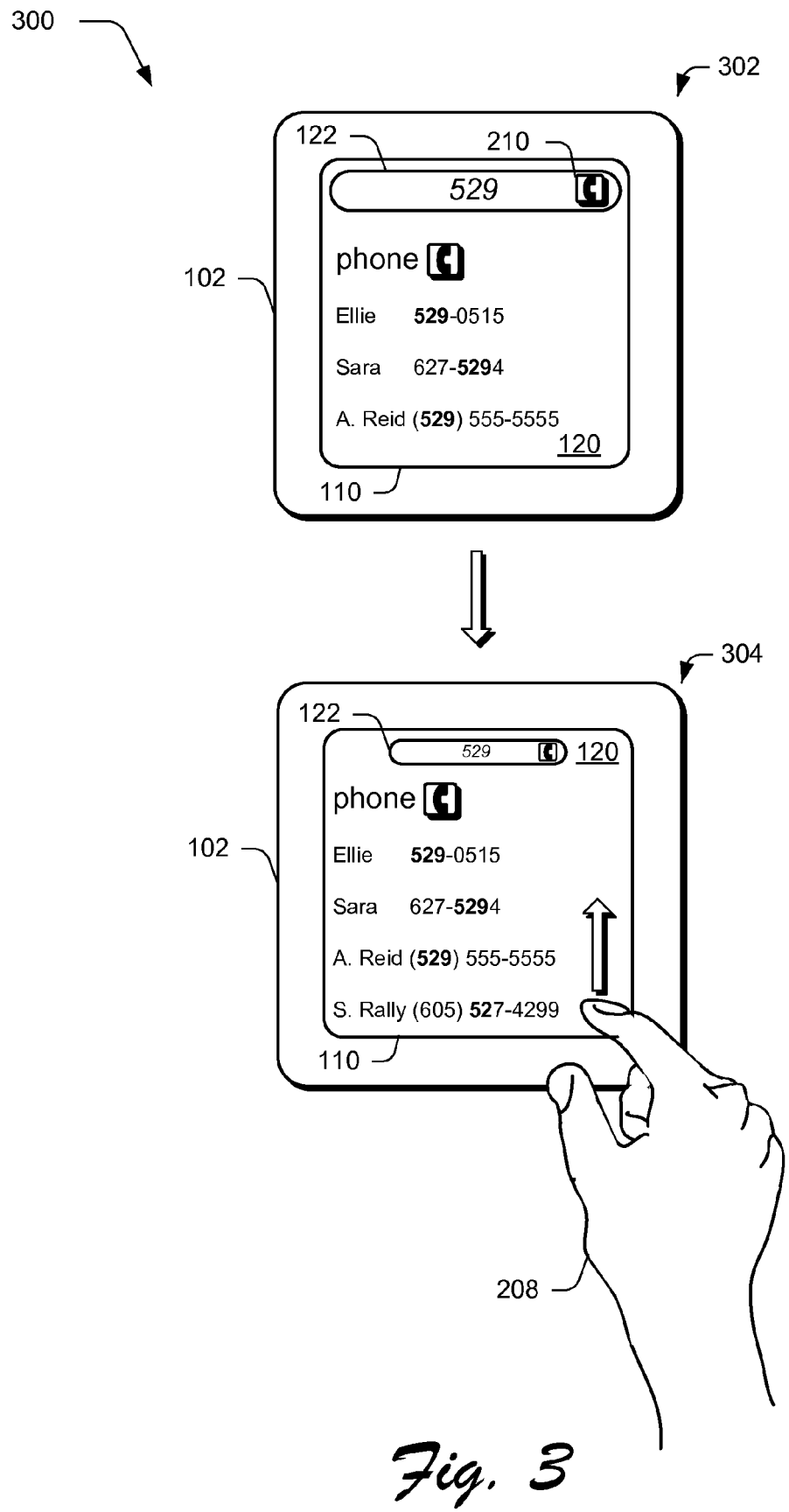
FIG. 3 illustrates an example implementation of a gesture received to scroll (e.g., pan up or down) through the user interface of FIG. 1.

The search query input area 122 may also be configured by the mobile communications device 102 for efficient use of an available amount of display area of the display device 110, an example 300 of such an implementation is illustrated in FIG. 3. The example 300 shows first and second instances 302, 304 of the mobile communications device 102.

In the first instance 302, the search query input area 122 is displayed at a first size (e.g., "full" size) to increase legibility of the search query as the search query is entered. In the second instance 304, however, the search query input area 122 is reduced (e.g., shrunk by thirty percent) in response to an input received from the user 208 to scroll through the search results. For example, as illustrated in FIG. 3 a gesture may be received to scroll (e.g., pan up or down) through the user interface 120. The search query input area 122 may return to the original size as illustrated in the first instance 302 when selected by a user. Thus, a user may scroll through search results vertically as shown in FIG. 3 and switch contexts horizontally as shown in FIG. 2, although it should be readily apparent that a variety of other implementations are also contemplated.

Figure 4:
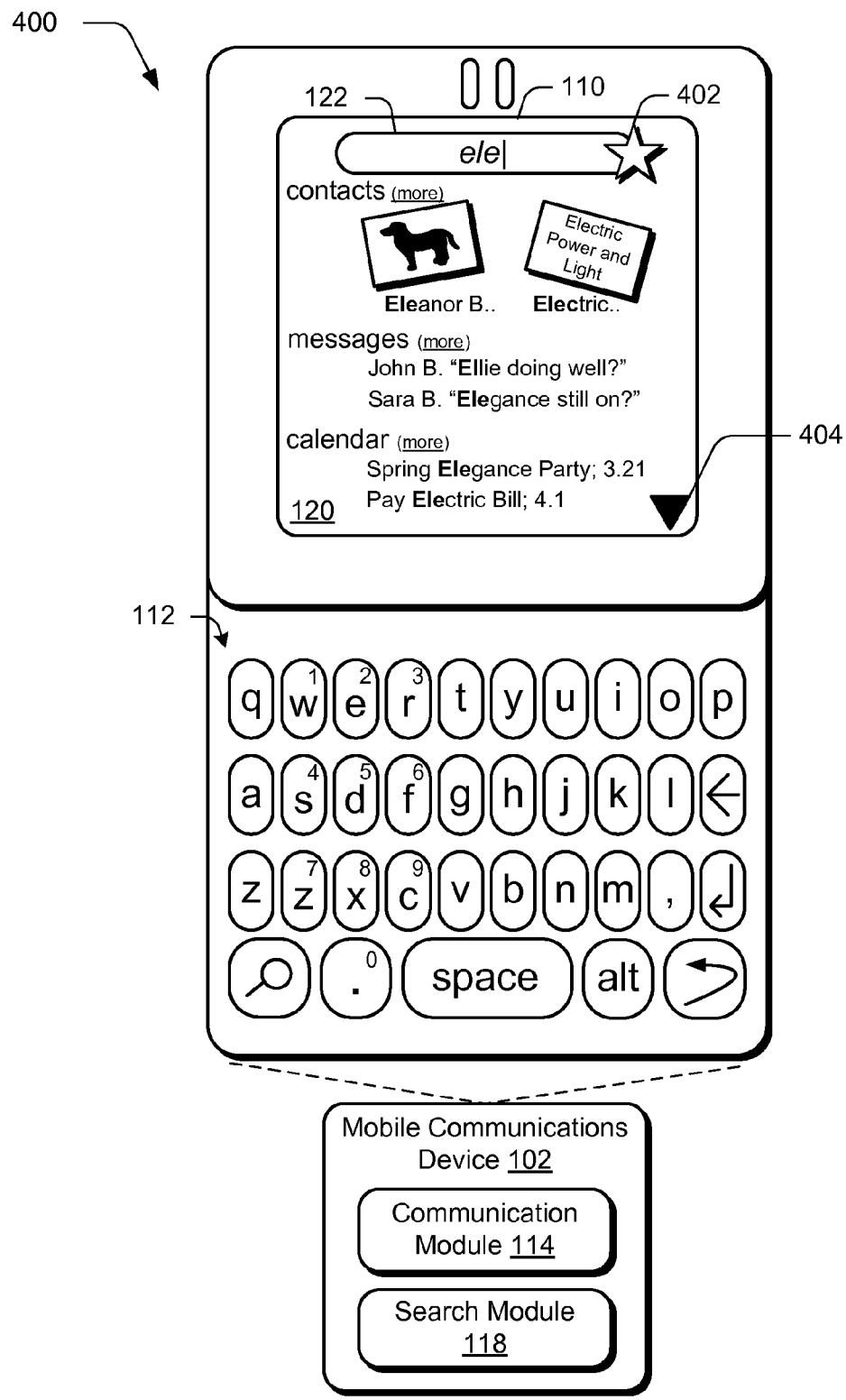
FIG. 4 illustrates an example implementation of the mobile communications device of FIG. 1 as outputting search results in response to a search query.

FIG. 4 illustrates an example implementation of the mobile communications device 102 of FIG. 1 as outputting search results in response to a search query. The user interface 120 is illustrated as organizing search results into a plurality of sub-categories, examples of which are illustrated as "contacts," "messages," and "calendar," which may or may not correspond to different contexts of a search. In an implementation, each category may have a respective progress indicator to indicate a status of a search within that category, such as by a color change through the text representation of the respective categories that mimics a status bar.

As the search query is being entered in the search query input area 122, the categories may be displayed next to each other. The search results may then be displayed in each respective category as found in real time. A variety of different categories may be supported, examples of which are listed below in a hierarchical arrangement that may be accessed through selecting a "more" button as illustrated for each category.

Web
    Instant answer
        Weather
        Stock
        Movie times
        Encyclopedia entry
    Web pages
    Image
    News
Phone
    Contacts
    Call history
    Messages
    Favorites
    Media (Music/Video)
    Calendar
Location
    Businesses In an implementation, the "More" button appears when there are more results than what fits into the first-level results page. When a search is completed, categories that do not contain search results may be removed from the user interface 120. If there are no results in each of the categories, a "No Results" message may be displayed in the user interface 120. Selection (e.g., "tapping") of a search result may cause the search result to be opened, e.g., to open an appointment on the calendar, display a body of a selected message, and so on. In an implementation, a user may interact with the user interface 120 to specify which of the contexts will appear in the user interface. For example, the user may interact with a series of checkboxes to select one or more of the above contexts.

The search module 118 may also support bookmark functionality for search results. For example, a favorites icon 402 (illustrated as a star in the user interface) may be displayed in the user interface 120 once one or more search results are found and displayed in the user interface 120. Selection of the favorites icon 402 may cause the search module 118 to add the search query to a home screen of the user interface 120 of the mobile communications device 102. Selection of the search query in the home screen may then be used to perform the search again and/or display a previous search result. In an implementation, if the search was performed in a specific context the search is repeated in that context, e.g., one of the columns of FIG. 2.

To view additional search results, a user may perform a gesture to "pan down" through the search results, select a scroll icon 404 (e.g., to scroll down a single page of search results) that is illustrated in a bottom-right corner of the user interface 120, and so on. If there are no additional search results, the scroll icon 404 is not displayed.

In an implementation, a user can scroll through a list of search results. When in a particular context (whether manually or automatically selected), the user may scroll past the "end" of the search results for that context. Scrolling past the end of the context may cause a search to be initiated for at least one other context, e.g., for each local context supported by the mobile communications device 102, for local and remote contexts, and so on. If additional results are not available, the scroll icon 404 may be removed from the user interface 120. In another implementation, the "end" of the search results is indicated by cropping the search results at the bottom of the user interface 120 if there are additional items to imply that the additional items are available to be viewed. If not, the search results at the end are displayed in full, i.e., an icon representing each search result is displayed in its entirety. The search results may also be configured to indicate a number of that search results are loading, further discussion of which may be found in relation to the following figure.

Figure 5:
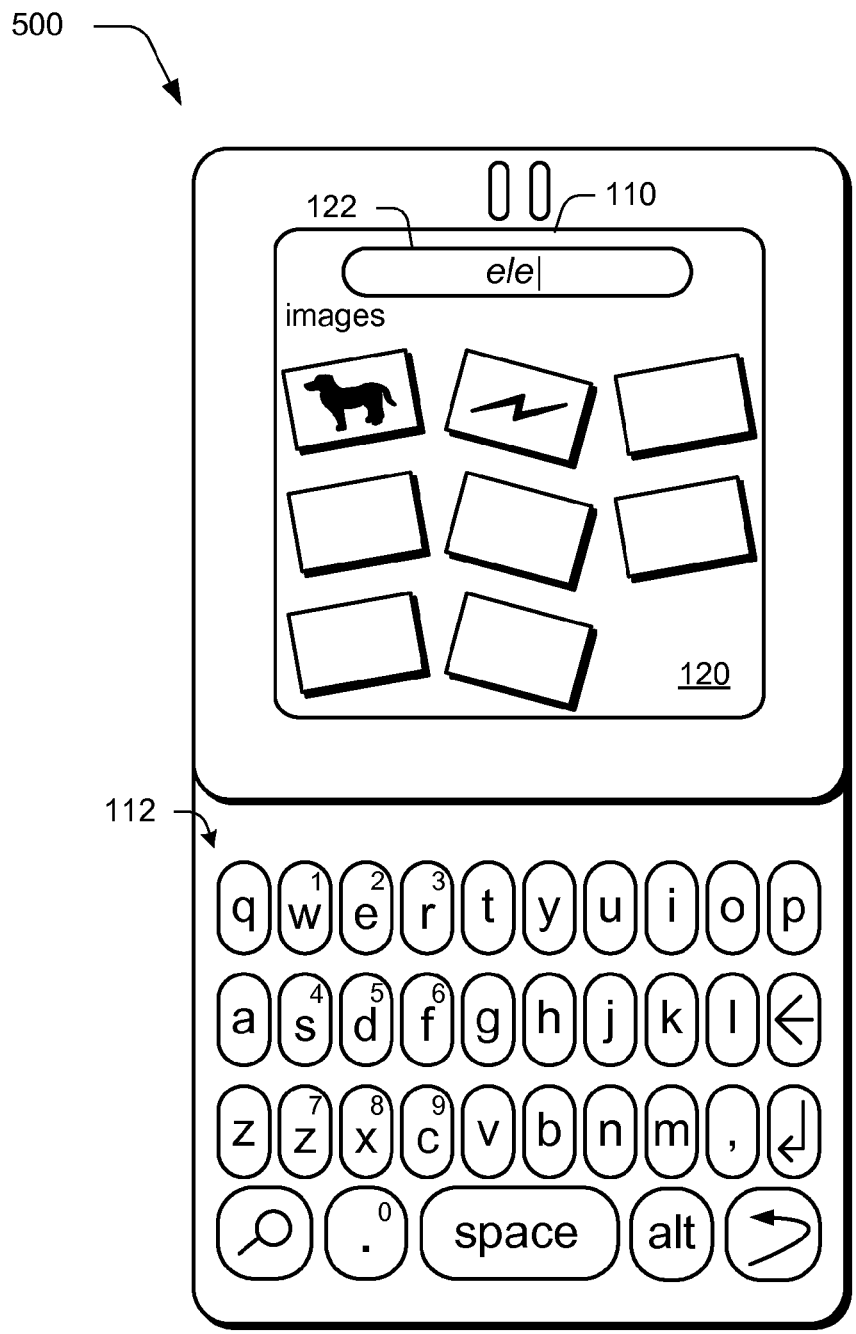
FIG. 5 illustrates an example implementation of loading search results by the mobile communications device of FIG. 1.

FIG. 5 illustrates an example implementation 500 of loading search results by the mobile communications device 102 of FIG. 1. In this example, the context of the search relates to images. Consequently, images are displayed in the user interface 120 as the search result is entered.

As the search results (e.g., images) are located, for instance, representations of the images are displayed in the user interface, examples of which include a dog and a bolt of electricity. Outlines of other images are displayed to indicate a number of search results found. These outlines may then be "filled in" as the images are loaded into the user interface 120. A variety of other techniques are also contemplated to indicate a number of search results as found and loading of the search results.

Figure 6:
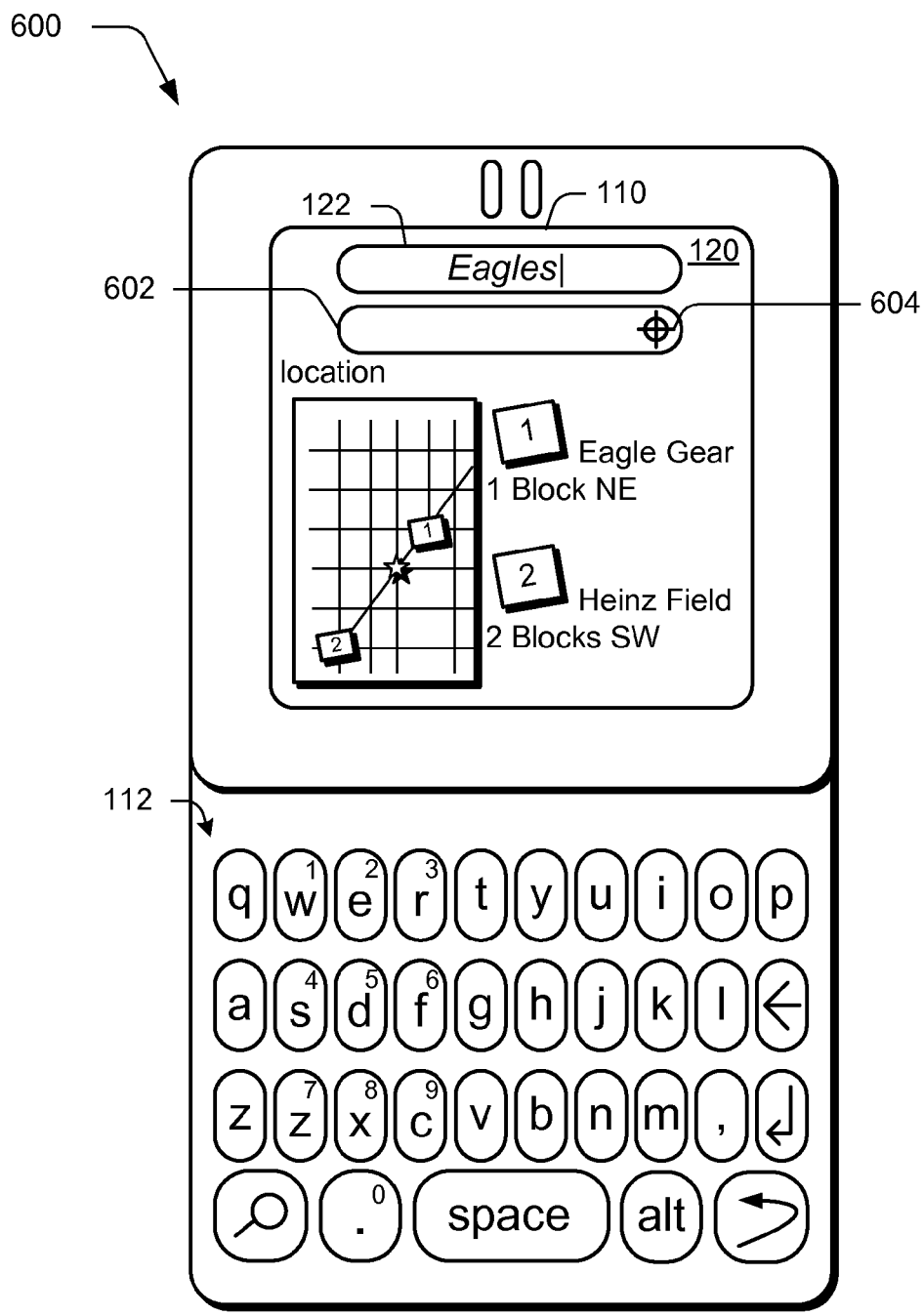
FIG. 6 illustrates an example implementation of a location context search of the user interface of the mobile communications device of FIG. 1.

FIG. 6 illustrates an example implementation of a location context search of the user interface 120 of the mobile communications device 102 of FIG. 1. The user interface 120 is shown as outputting a location context. As illustrated, the user interface 120 includes a search query input area 122 like the location context 206 of FIG. 2.

However, in this example a location portion 602 is also included for entering a location that is to be used as a basis for performing a search. For instance, a user may use the keyboard 112 to enter a location that is to be used as a basis for a search query entered in the search query input area 122. A user may also select a location icon 604 to use a current geographical location of the mobile communications device 102. Selection of the location icon 604 may case the location portion 602 to be automatically populated with the current geographical location, which may be determined through GPS, triangulation using wireless transmitters, and so on. Selection of a search result (e.g., tapping), may cause the user interface to output a view of the result on a map, e.g., in a web browser.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination of software and firmware. In the case of a software implementation, the module, functionality, or logic represents instructions (e.g., program code) that perform specified tasks when executed on a computing system formed by one or more computers having one or more processors (e.g., CPU or CPUs). The instructions may be stored in one or more tangible computer readable memory devices. The features of the contextual search techniques described below are platform-independent, meaning that the techniques may be implemented on a variety of commercial computing platforms having a variety of processors.

Example Procedures

The following discussion describes contextual search techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the implementations 200-600 of FIGS. 2-6, respectively.

Figure 7:
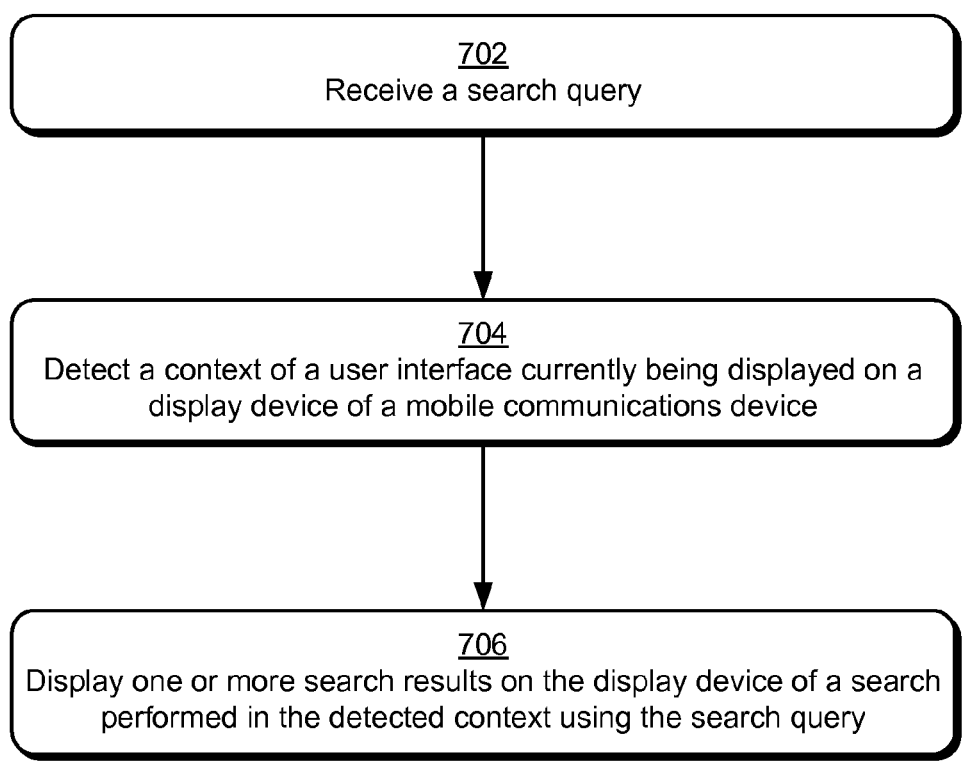
FIG. 7 is a flow diagram depicting a procedure in an example implementation in which a current context of a user interface is used to scope a search.

FIG. 7 depicts a procedure 700 in an example implementation in which a current context of a user interface is used to scope a search. A search query is received (block 702), such as through the keyboard 110 and displayed in the search query input area 122 of the user interface 120.

A context is detected of a user interface currently being displayed on a display device of a mobile communication device (block 704). For example, the display device 102 may be used to output the user interface 120 in a variety of different configurations for a variety of different applications, such as a music player application, contacts application, telephone application, web browser, location application, and so on. Accordingly, each of these different applications may provide a different context for the user interface 120, such as to display different types of content. Types of content may vary greatly, such as music, video, documents, contacts, and so on and may be detected in a variety of ways, such as based on an extension that identifies the type. Therefore, the search module 118 may leverage the current context to increase a likelihood of finding a relevant search result.

One or more search results are displayed on the display device of a search performed in the detected context using the search query (block 706). As shown in FIG. 2, for instance, search results may be displayed in a phone 202 context as a column. Contexts may also be switched by a user to perform additional searches, such as to switch from a first context to a second context as described in relation to FIG. 8 and/or "scope out" a search as described in relation to FIG. 9.

Figure 8:
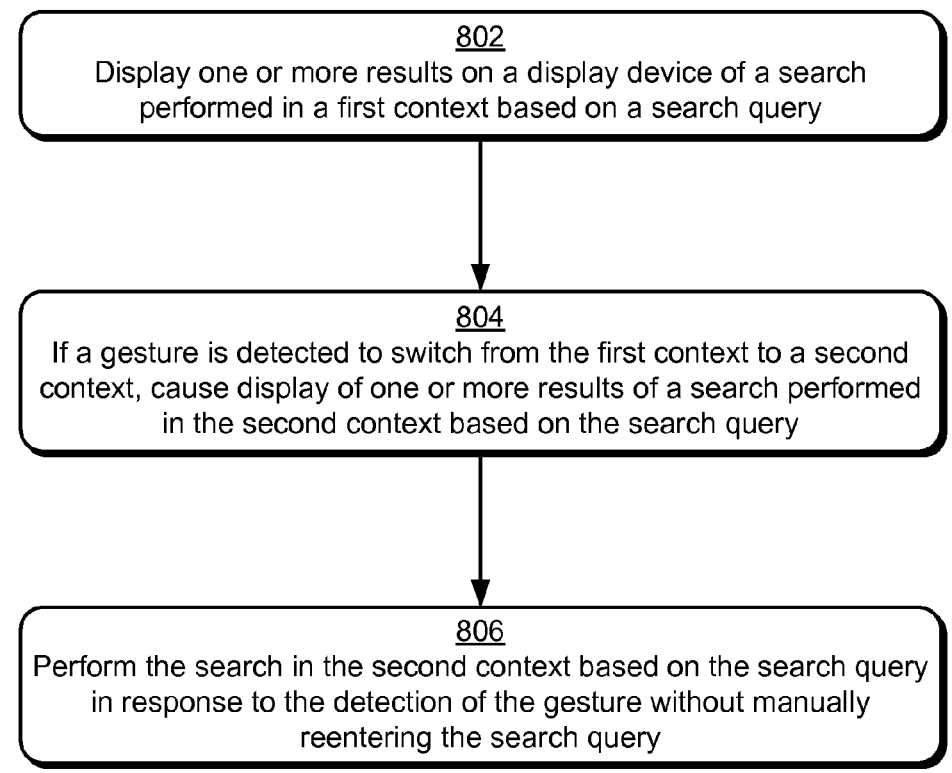
FIG. 8 is a flow diagram depicting a procedure in an example implementation in which a switch is performed between first and second contexts of a search using a gesture.

FIG. 8 depicts a procedure 800 in an example implementation in which a switch is performed between first and second contexts of a search using a gesture. One or more results are displayed on a display device of a search performed in a first context based on a search query (block 802). For example, the first context may be a phone 202 context based on a telephone application is that currently configuring the user interface 120. Accordingly, a search performed in this context may result in search results that include telephone numbers as illustrated in FIG. 2.

If a gesture is detected to switch from the first context to a second context, cause display of one or more results of a search performed in the second context based on the search query (block 804). Additionally, the search may be performed based on the search query in response to the detection of the gesture without manually reentering the search query (block 806). Continuing with the previous example, a user may wish to switch from the phone 202 context to the location 206 context. Therefore, a finger of the user's hand 208 may make a panning gesture across the display device 110. Touchscreen functionality of the display device 110 may be used to detect the gesture and therefore recognize that a switch is to be performed.

In response to this detection, the search module 118 may use the search query from the first search and perform another search in the relevant context, such as location 206 in this example. Although performance of first and second searches has been described, a variety of other examples are also contemplated. For example, the first and second searches in the respective first and second contexts may be performed concurrently (e.g., is a single search). Results of this search may then be separated based on context such that the user may navigate between the contexts to see different search results. Thus, the contexts may be searched in a variety of ways without manually reentering the search query.

Figure 9:
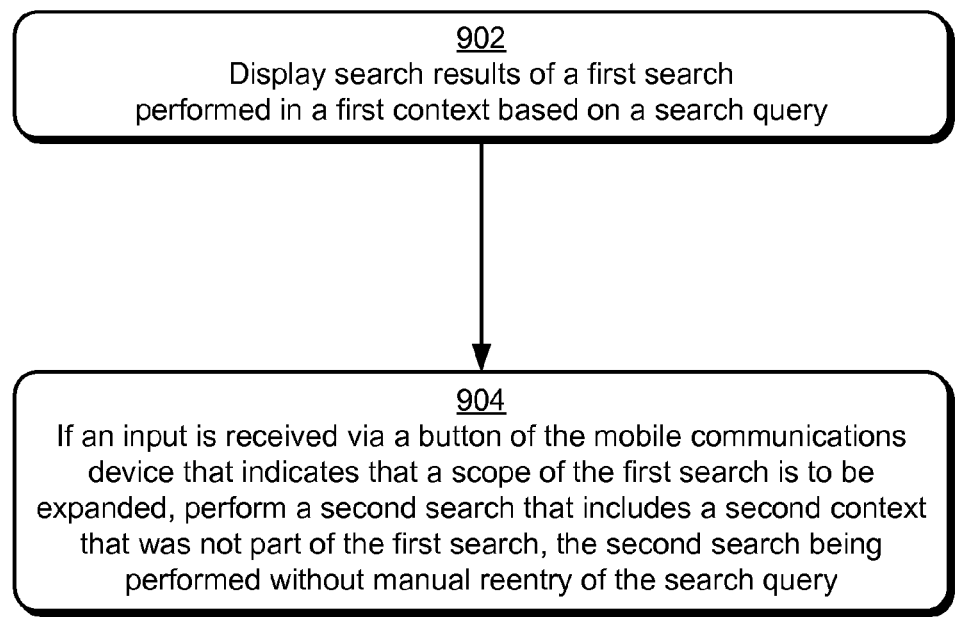
FIG. 9 is a flow diagram depicting a procedure in an example implementation in which a search is scoped out to include an additional context.

FIG. 9 depicts a procedure 900 in an example implementation in which a search is scoped out to include an additional context. Search results are displayed of a first search performed in a first context based on a search query (block 902). If an input is received via a button of the mobile communications device that indicates that a scope of the first search is to be expanded, a second search is performed. The second search is performed in a second context that was not part of the first search without manual reentry of the search query (block 904).

For example, a dedicated search key 132 of a keyboard 112 of the mobile communications device 102 may be pressed to load the search query input area 122. When the search key 132 was pressed, the mobile communications device 102 may be in a phone 128 context and accordingly a search is performed in that context. However, a user may have mistakenly entered the search query while in the phone 128 context and desire another context, such as music. Accordingly, the user may press the back 132 button to scope out to search the mobile communications device 102 as a whole and not just phone numbers. Pressing the back 132 button again may cause the search to be expanded past local storage of the mobile communications device 102 to include content available remotely over the network 116. A variety of other examples are also contemplated.

Example Device

Figure 10:
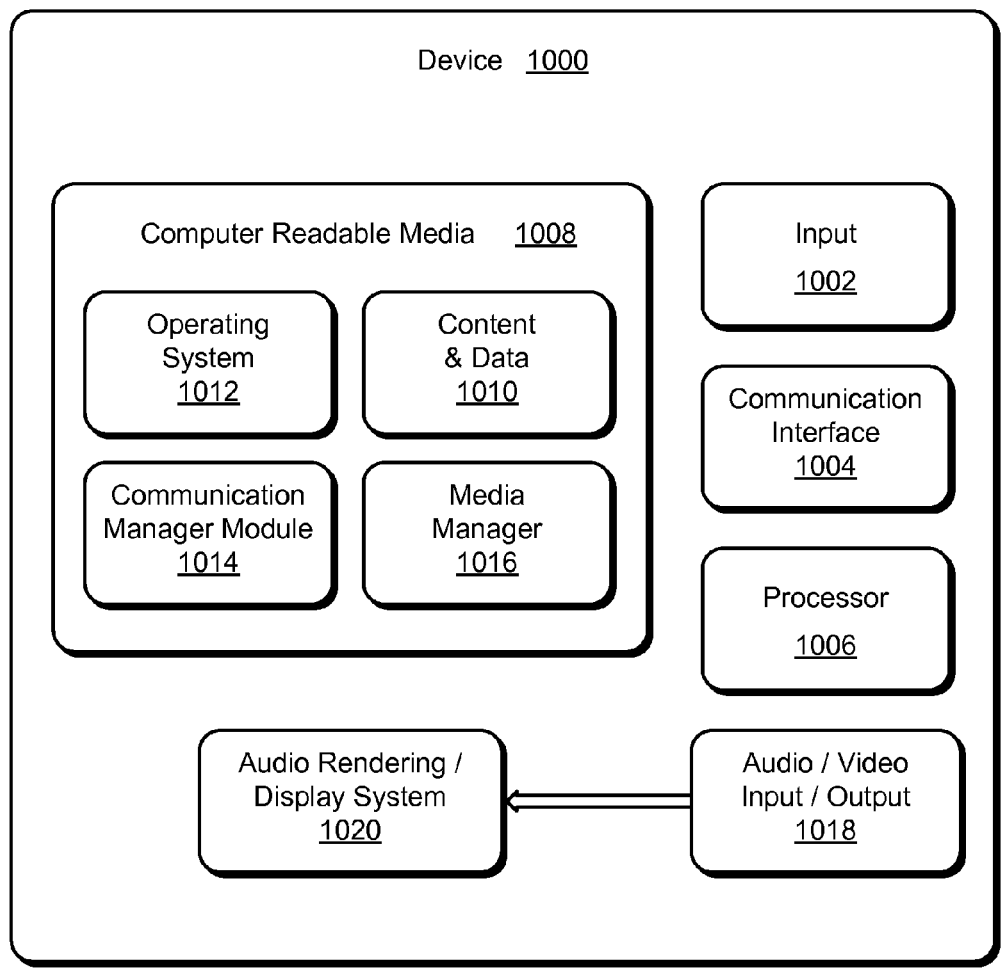
FIG. 10 illustrates various components of an example device that can be implemented in various embodiments as any type of a mobile device to implement embodiments of devices, features, and systems for mobile communications.

FIG. 10 illustrates various components of an example device 1000 that can be implemented in various embodiments as any type of a mobile device to implement embodiments of devices, features, and systems for mobile communications. For example, device 1000 can be implemented as any of the mobile communications devices 102 described with reference to respective FIGS. 1-6. Device 1000 can also be implemented to access a network-based service, such as a content service.

Device 1000 includes input(s) 1002 that may include Internet Protocol (IP) inputs as well as other input devices, such as the keyboard 112 of FIGS. 1-60. Device 1000 further includes communication interface(s) 1004 that can be implemented as any one or more of a wireless interface, any type of network interface, and as any other type of communication interface. A network interface provides a connection between device 1000 and a communication network by which other electronic and computing devices can communicate data with device 1000. A wireless interface enables device 1000 to operate as a mobile device for wireless communications.

Device 1000 also includes one or more processors 1006 (e.g., any of microprocessors, controllers, and the like) which process various computer-executable instructions to control the operation of device 1000 and to communicate with other electronic devices. Device 1000 can be implemented with computer-readable media 1008, such as one or more memory components, examples of which include random access memory (RAM) and non-volatile memory (e.g., any one or more of a read-only memory (ROM), flash memory, EPROM, EEPROM, etc.).

Computer-readable media 1008 provides data storage to store content and data 1010, as well as device applications and any other types of information and/or data related to operational aspects of device 1000. For example, an operating system 1012 can be maintained as a computer application with the computer-readable media 1008 and executed on processor(s) 1006. Device applications can also include a communication manager module 1014 (which may be used to provide telephonic functionality) and a media manager 1016.

Device 1000 also includes an audio and/or video output 1018 that provides audio and/or video data to an audio rendering and/or display system 1020. The audio rendering and/or display system 1020 can be implemented as integrated component(s) of the example device 1000, and can include any components that process, display, and/or otherwise render audio, video, and image data. Device 1000 can also be implemented to provide a user tactile feedback, such as vibrate and haptics.

The communication manager module 1014 is further illustrated as including a keyboard module 1022. The keyboard module 1022 is representative of functionality employ one or more of the techniques previously described in relation to FIGS. 1-6.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile communications device comprising a display device and one or more modules configured to:
   display search results on the display device of a first search performed in a first context that involves a single application based on a search query;
   reduce a search query input area on the display device in response to an input to scroll through the search results;
   during display of the search results of the first search and responsive to receiving an input via a pan gesture that indicates that a scope of the first search is to be expanded to another application, perform a second search that includes a second context that involves the other application, the second search being performed without manual reentry of the search query; and
   responsive to receiving the input via the pan gesture, cause the second search to expand from searching content in a local storage of the mobile communications device to searching content remote from the mobile communications device.

2. A mobile communications device as described in claim 1, wherein the first search is for content that is local to the mobile communications device and the second search is for content accessible to the mobile communications device via a network connection.

3. A mobile communications device as described in claim 1, wherein the first and second searches involve telephone numbers.

4. A mobile communications device as described in claim 1, wherein the first context is user selectable through interaction with a user interface displayed on the display device.

5. A mobile communications device as described in claim 1, the one or more modules further configured to output the search results of the first search in a plurality of categories.

6. A mobile communications device as described in claim 1, the one or more modules further configured to display search results of the second search on the display device.

7. A method comprising:
   displaying search results on a display device of a mobile communications device, the search results of a first search performed in a first context that involves a first application based on a search query;
   responsive to receiving a vertical pan gesture on the display device of the mobile communications device, scrolling through the search results of the first search and reducing a search query input area displayed in a user interface of the mobile communications device; and
   responsive to receiving a horizontal pan gesture on the display device of the mobile communications device, performing a second search that includes a second context that involves a second application which was not part of the first search, the second search being performed without manual reentry of the search query, the second application being determined based, at least in part, on the horizontal pan gesture.

8. A method as described in claim 7, wherein the horizontal pan gesture causes the search to be expanded past local storage of the mobile communications device to include content available remotely over a network.

9. A method as described in claim 7, wherein the first search is for content that is local to the mobile communications device and the second search is for content that accessible to the mobile communications device via a network connection.

10. A method as described in claim 7, wherein the first and second searches involve at least a portion of a telephone number.

11. A method as described in claim 7, wherein the first context is user selectable through interaction with a user interface displayed on the display device.

12. A method as described in claim 7, further comprising animating a visual representation on the display device of the mobile communications device to indicate the context of the first search.

13. A method as described in claim 7, further comprising initiating another search in a different context responsive to scrolling past the end of the search results of the first search performed in the first context.

14. A method as described in claim 7, wherein the first context and the second context each correspond to an individual application.

15. A method as described in claim 7, further comprising associating content with the first context based on an extension type.

16. One or more computer readable memory devices comprising instructions stored thereon that, responsive to execution by a mobile communications device, causes the mobile communications device to perform operations comprising:
displaying search results on a display device of the mobile communications device, the search results of a first search performed in a first context that involves a single application based on a search query;
reducing a search query input area on the display device in response to an input to scroll through the search results;
if an input is received via a single press of a button of the mobile communications device that indicates that a scope of the first search is to be expanded beyond the first context that involves the single application, performing a second search that includes a second context that involves a plurality of applications stored on the mobile communications device; and
if a subsequent input is received via another single press of the button of the mobile communications device, performing a third search that includes a third context, the third search being performed for content accessible via a network, the second search and the third search being performed without manual reentry of the search query.

17. One or more computer readable memory devices as described in claim 16, wherein the button comprises a back button.

18. One or more computer readable memory devices as described in claim 16, wherein the first search is for content that is local to the mobile communications device and the third search is for content that accessible to the mobile communications device via a network connection.

19. One or more computer readable memory devices as described in claim 16, wherein the first and second searches involve a location.

20. One or more computer readable memory devices as described in claim 16, wherein the first context is user selectable through interaction with a user interface displayed on the display device.

* * * * *